(12) United States Patent
Darling et al.

(10) Patent No.: US 10,637,082 B2
(45) Date of Patent: Apr. 28, 2020

(54) FLOW BATTERY WITH CARBON PAPER

(75) Inventors: Robert Mason Darling, South Windsor, CT (US); Laura Roen Stolar, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 939 days.

(21) Appl. No.: 14/364,685

(22) PCT Filed: Dec. 20, 2011

(86) PCT No.: PCT/US2011/066149
§ 371 (c)(1),
(2), (4) Date: Jun. 12, 2014

(87) PCT Pub. No.: WO2013/095380
PCT Pub. Date: Jun. 27, 2013

(65) Prior Publication Data
US 2014/0302423 A1 Oct. 9, 2014

(51) Int. Cl.
*H01M 8/04186* (2016.01)
*H01M 8/18* (2006.01)
(Continued)

(52) U.S. Cl.
CPC ....... *H01M 8/04186* (2013.01); *H01M 4/861* (2013.01); *H01M 4/8605* (2013.01);
(Continued)

(58) Field of Classification Search
CPC ............. H01M 8/04186; H01M 8/188; H01M 4/8605; H01M 4/861; H01M 4/96; H01M 8/20; H01M 8/18; Y02E 60/528
See application file for complete search history.

(56) References Cited

U.S. PATENT DOCUMENTS 5,318,865 A  6/1994 Kaneko et al.
5,648,184 A  7/1997 Inoue et al.
(Continued)

FOREIGN PATENT DOCUMENTS

JP  S54-19228   7/1979
JP  H02-148659  6/1990
(Continued)

OTHER PUBLICATIONS

Toray Group "Electrode base material for fuel cell Physical property table" accessed from http://www.torayca.com/en/lineup/composites/com_009_01.html on May 31, 2017.*
(Continued)

*Primary Examiner* — Milton I Cano
*Assistant Examiner* — Philip A. Stuckey
(74) *Attorney, Agent, or Firm* — Carlson, Gaskey & Olds, P.C.

(57) ABSTRACT

A flow battery includes a liquid electrolyte having an electrochemically active specie. A flow field plate includes a first flow field channel and a second flow field channel that is separated from the first flow field channel by a rib. There is a flow path for the liquid electrolyte to flow over the rib between the channels. An electrode is arranged adjacent the flow field plate such that the liquid electrolyte that flows over the rib must flow through the electrode. The electrode includes a carbon paper that is catalytically active with regard to liquid electrolyte. The carbon paper defines a compressive strain of less than 20% at a compressive stress of 0.8 MPa and an uncompressed porosity in the range 60-85%.

17 Claims, 1 Drawing Sheet

(51) Int. Cl.
H01M 4/86 (2006.01)
H01M 4/96 (2006.01)
H01M 8/20 (2006.01)

(52) U.S. Cl.
CPC ............. H01M 4/96 (2013.01); H01M 8/188 (2013.01); H01M 8/20 (2013.01); Y02E 60/528 (2013.01)

(56) References Cited

U.S. PATENT DOCUMENTS

| | | | |
|---|---|---|---|
| 6,007,933 | A | 12/1999 | Jones |
| 9,166,243 | B2 | 10/2015 | Perry |
| 2003/0129468 | A1 | 7/2003 | Issacci et al. |
| 2005/0106450 | A1 | 5/2005 | Castro et al. |
| 2008/0274393 | A1 | 11/2008 | Markoski et al. |
| 2008/0292938 | A1 | 11/2008 | Perry et al. |
| 2009/0092882 | A1* | 4/2009 | Kjeang ............... H01M 4/8605 429/506 |
| 2009/0136789 | A1 | 5/2009 | Pien et al. |
| 2011/0008706 | A1* | 1/2011 | Cipollini ............. H01M 4/8605 429/483 |
| 2011/0223450 | A1 | 9/2011 | Horne et al. |
| 2012/0258345 | A1* | 10/2012 | Zaffou ................ H01M 4/8605 429/105 |

FOREIGN PATENT DOCUMENTS

| | | |
|---|---|---|
| JP | 2006-156029 | 6/2006 |
| KR | 20100040606 | 4/2010 |
| WO | 2010107429 A1 | 9/2010 |
| WO | 2011075135 | 6/2011 |

OTHER PUBLICATIONS

"Toray Paper 090—PTFE Treated" accessed from http://www.fuelcellsetc.com/store/Toray-Paper-090 on Jun. 1, 2017.*
Weber, A.Z., Mench, M.M., Meyers, J.P. et al. J Appl Electrochem (2011) 41: 1137.*
Aaron, Doug, et al. "Polarization curve analysis of all-vanadium redox flow batteries." Journal of Applied Electrochemistry;41.10 (2011): 1175. (Year: 2011).*
Electrode base material for fuel cell Physical property table_ TORAYCA® _TORAY accessed on Dec. 11, 2018 from: http://www.torayca.com/en/lineup/composites/com_009_ 01.html (Year: 2018).*
"Toray Carbon Fiber Paper "TGP-H"" accessed from https://web.archive.org/web/20070123015458/http:/www.fuelcellstore.com/products/toray/specs.pdf (Year: 2007).*
Screenshot of https://web.archive.org/web/20070123015458/http://www.fuelcellstore.com/products/toray/specs.pdf (Year: 2019).*
Luo, X., Lu, Z., Xi, J., Zenghua, W., Zhu, W., Chen, L., and Qiu, X. (2005). Influences of permeation of vanadium ions through PVDF-g-PSSA membranes on performances of vanadium redox flow batteris. J. Phys. Chem. B 2005, 109, 20310-20314.
Yue, L., Weishan, L., Fengqiang, S., Zhoa, L., and Xing, L. (2010). Highly hydroxylated carbon fibres as electrode materials of all-vanadium redox flow battery. Carbon 48(11). Sep. 2010. pp. 3079-3090.
Weber, A..Z. et al. (2011). Redox flow batteries: a review. Journal of Applied Electrochemistry. Sep. 2, 2011.
Escribano, S. et al. (2006). Characterization of PEMFCs gas diffusion layers properties. Journal of Power Sources, vol. 156, No. 1, May 19, 2006.
Selvarani, G. et al. (2008). Effect of diffusion-layer porosity on the performance of polymer electrolyte fuel cells. Journal of Applied Electrochemistry. Nov. 22, 2007.
European Search Report for European Patent Application No. 11877784 completed May 26, 2015.

International Preliminary Report on Patentability for PCT Application No. PCT/US2011/66149 dated Jun. 13, 2014.
International Search Report and Written Opinion for International Application No. PCT/US2011/066149 completed on Apr. 3 2012.
File History for U.S. Appl. No. 13/513,651 now U.S. Pat. No. 9,166,243 issued Oct. 20, 2015.
Certified Translation. Japanese Publication of Examined Patent Application No. S52-102887 published Jul. 13, 1979.
Certified Translation. Japanese Unexamined Patent Application No. H2-148659 published Jun. 7, 1990.
Certified Translation. Japanese Unexamined Patent Application No. 2006-156029 published Jun. 15, 1990.
Linden, D. and Reddy, T.B. Eds. (2002). Handbook of batteries. New York, NY: McGraw-Hill. pp. 37.12, 18-23, 42.3-13, 43.11-3, Appendix A.
Laramini, J. and Dicks, A. (2003). Fuel cell systems explained. Chichester, England: John Wiley & Sons Inc. pp. xv, xvi, 18-9, 88-9, 94-6.
Haar, D. (2016). Dan Haar: United Technologies battery could upend the power business. Hartford Courant. Retrieved Feb. 22, 2017 from: http://www.courant.com/business/dan-haar/hc-haar-united-technologies-battery-for-electric-grid-20160523-column.html.
Aricò, A.S., Cretì, P., Baglio, V., Modica, E., and Antonucci, V. (2000). Influence of flow field design on the performance of a direct methanol fuel cell. Journal of Power Sources vol. 91. 2000. pp. 202-209.
Li, X. and Sabir, I. (2004). Review of bipolar plates in PEM fuel cells: Flow-field designs. International Journal of Hydrogen Energy vol. 30. 2005. pp. 359-371.
Negishi, A. (2003). Redox flow battery. (Certified Translation). Fuel Cells vol. 2(4). 2001 pp. 69-74.
Yi, J.S., and Nguyen T.V. (1996). Abstract: Hydrodynamics of reactant gas in the electrode of PEM fuel cells with inter-digitated flow fields. The Electrochemical Society, Inc. Meeting Abstracts. Fall Meeting, San Antonio, TX. Oct. 6-11, 1996. p. 974-6.
Kazim, A., Liu, H.T., and Forges, P. (1999). Modelling of performance of PEM fuel cells with conventional and interdigitated flow fields. Journal of Applied Electrochemistry vol. 29(12). 1999. pp. 1409-1416.
Wang, L. and Liu, H. (2004). Performance studies of PEM fuel cells with interdigitated flow fields. Journal of Power Sources vol. 13(2). 2004. pp. 185-196.
Guo, S.M. (2005). The simulation of a PEMFC with an interdigitated flow field design. Computational Science 5th International Conference. May 2005. pp. 104-111.
He, W., Yi, J.S., Nguyen, T.V. (2000). Two-phase flow model of the cathode of PEM fuel ceels using interdigitated flow fields. AIChE Journal vol. 46(10). Oct. 2000. pp. 2053-2064.
Nozaki, K., Hamamoto, O., Kaneko, H., and Ozawa, T. (1975). (Certified Translation). Prospect of power storage using redox flow type secondary battery. Electrochemical/Electro-thermal Study Group Material. The Institute of Electrical Engineers of Japan. Nov. 28, 1975. pp. 1-16.
Declaration of Dr. Toru Kato, Ph.D. In re U.S. Pat. No. 9,166,243. Executed Feb. 23, 2017. pp. 1-89.
Prior Art Claim Chart for U.S. Pat. No. 9,166,243.
Ponce de León, C., Frías-Ferrer, A., González-García, Szánto, D.A., and Walsh, F.C. (2006). Redox flow cells for energy conversion. Journal of Power Sources vol. 160. 2006. pp. 716-732.
Negishi, A. (2003). Redox flow battery. Fuel Cells vol. 2(4). 2003. pp. 69-74.
Nozaki, K., Hamamoto, O., Kaneko, H., and Ozawa, T. (1975). Prospect of power storage using redox flow type secondary battery. Electrochemical/Electro-thermal Study Group Material. The Institute of Electrical Engineers of Japan. Nov. 28, 1975. pp. 1-16.
Shigematsu, T. (2011). Redox flow battery for energy storage. SEI Technical Review No. 73. Oct. 2011. pp. 4-13.
Tokuda, N., Kanno, T., Hara, T., Shigematsu, T., Tsutsui, Y., Ikeuchi, A., Itou, T., et al. (2000). Development of a redox flow battery system. SEI Technical Review No. 73. Jun. 2000. pp. 88-94.
Hagedorn, N.H. (1984). NASA redox storage system development project. Final Report. DOE/NASA/12726-24. Oct. 1984. pp. 1-43.

(56) References Cited

OTHER PUBLICATIONS

Sumitomo Electric. Redox Flow Battery. Technical Document. Retrieved May 8, 2017 from: http://global-sei.com/products/redox/pdf/redox-flow-battery.pdf.
Petition for Inter Partes Review of U.S. Pat. No. 9,166,243. *Sumitomo Electric Industries, Ltd.*, Petitioner, v. *United Technologies Corporation*, Patent Owner. Filed Feb. 23, 2017.

* cited by examiner

FLOW BATTERY WITH CARBON PAPER

BACKGROUND

This disclosure relates to flow batteries for selectively storing and discharging electric energy.

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A basic flow battery includes a redox flow cell having a negative electrode and a positive electrode separated by an ion-exchange membrane or a non-conductive separator filled with electrolyte. A negative electrolyte is delivered to the negative electrode and a positive electrolyte is delivered to the positive electrode to drive an electrochemically reversible redox reaction. Upon charging, the electrical energy supplied causes a chemical reduction reaction in one electrolyte and an oxidation reaction in the other electrolyte. The ion-exchange membrane prevents the electrolytes from mixing rapidly but permits selected ions to pass through to complete the redox reactions while electrically isolating the two electrodes. Upon discharge, the chemical energy contained in the electrolyte is released in the reverse reactions and electrical energy can be drawn from the electrodes. Flow batteries are distinguished from other electrochemical devices by, inter alia, the use of externally-supplied, liquid electrolytes on at least on side that participate in a reversible electrochemical reaction.

SUMMARY

Disclosed is a flow battery that includes a liquid electrolyte having an electrochemically active specie. A flow field plate includes a first flow field channel and a second flow field channel that is separated from the first flow field channel by a rib. There is a flow path for the liquid electrolyte to flow over the rib between the channels. An electrode is arranged adjacent the flow field plate such that the liquid electrolyte that flows over the rib must flow through the electrode. The electrode includes a carbon paper that is catalytically active with regard to liquid electrolyte. The carbon paper defines a compressive strain of less than 20% at a compressive stress of 0.8 MPa and an uncompressed porosity in the range 60-85%.

In another aspect, the carbon paper has an average uncompressed thickness of 150-400 micrometers and a porosity of 65-85 vol %.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
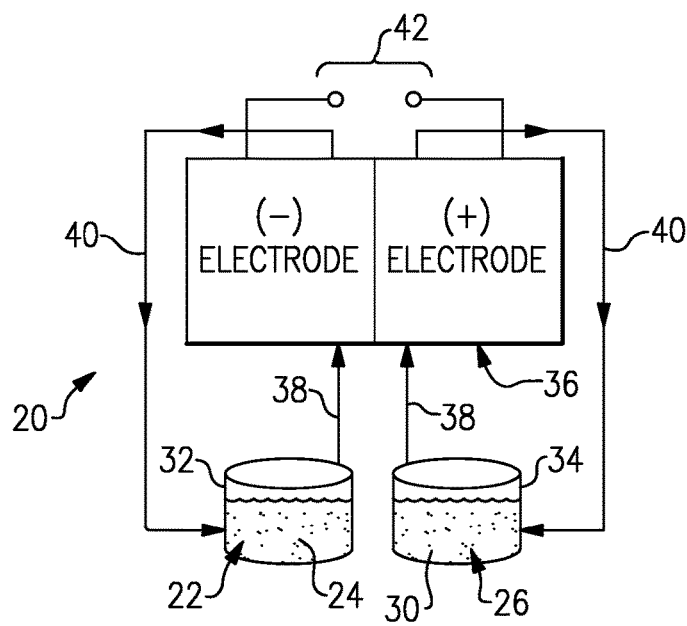
FIG. 1 illustrates an example flow battery.

FIG. 1 illustrates selected portions of an example flow battery 20 for selectively storing and discharging electrical energy. As an example, the flow battery 20 may be used to convert electrical energy generated in a renewable energy system to chemical energy that can be stored until a later time at which there is demand for the electrical energy. The flow battery 20 may then convert the chemical energy into electrical energy for supply to an electric grid, for example. As will be described, the flow battery 20 includes features for enhanced performance and durability.

The flow battery 20 includes a liquid electrolyte 22 that has an electrochemically active specie 24 that functions in a redox pair with regard to an additional liquid electrolyte 26 and electrochemically active specie 30. For example, the electrochemically active species are based on vanadium, bromine, iron, chromium, zinc, cerium, lead or combinations thereof. In embodiments, the liquid electrolytes 22 and 26—may be aqueous or non-aqueous solutions that include one or more of electrochemically active species.

The liquid electrolytes 22 and 26 are contained in respective storage tanks 32 and 34. As shown, the storage tanks 32 and 34 are substantially equivalent cylindrical storage tanks; however, the storage tanks 32 and 34 can alternatively have other shapes and sizes.

The liquid electrolytes 22 and 26 are delivered (e.g., pumped) to one or more cells 36 through respective feed lines 38 and are returned from the cell or cells 36 to the storage tanks 32 and 34 via return lines 40.

In operation, the liquid electrolytes 22 and 26 are delivered to the cell 36 to either convert electrical energy into chemical energy or convert chemical energy into electrical energy that can be discharged. The electrical energy is transmitted to and from the cell 36 through an electrical pathway 42 that completes the circuit and allows the completion of the electrochemical redox reactions.

Figures 2, 3, 4:
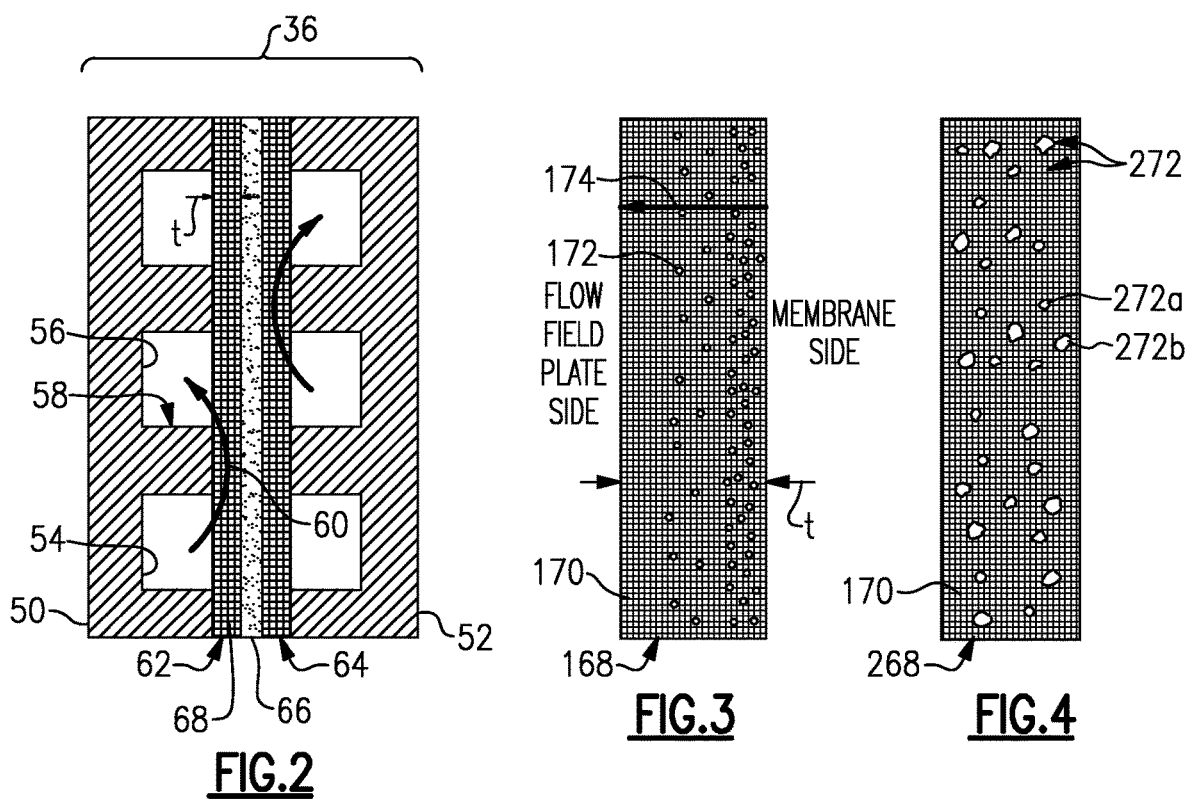
FIG. 2 illustrates an example flow battery cell of the flow battery of FIG. 1.
FIG. 3 illustrates a carbon paper of a flow battery cell.
FIG. 4 illustrates another example carbon paper of a flow battery cell.

FIG. 2 shows an example of the cell 36. It is to be understood that the flow battery 20 can include a plurality of the cells 36 in a stack, depending on the designed capacity of the flow battery 20. As shown, the cell 36 includes a first flow field plate 50 and a second flow field plate 52 spaced apart from the first flow field plate 50. The second flow field plate 52 may be substantially similar to the first flow field plate 50, as will be described below.

The first flow field plate 50 includes a first flow field channel 54 and a second flow field channel 56 that is separated from the first flow field channel 54 by a rib 58. The arrangement of the flow field channels 54 and 56 is such that there is a flow path 60 for the liquid electrolyte 22 or 26 to flow over the rib 58 between the channels 54 and 56.

First and second electrodes 62 and 64 are arranged adjacent the respective first and second flow field plates 50 and 52 such that the liquid electrolyte 22 or 26 that flows over the ribs 58 must flow through the corresponding electrode 62 or 64. In this example, an ion-exchange membrane 66 is arranged between the electrodes 62 and 64.

In the illustrated embodiment, one or both of the electrodes 62 and 64 include a carbon paper 68, such as carbon fiber paper, that is catalytically active with regard to the liquid electrolyte 22 and/or 26. That is, the surfaces of the carbon material of the carbon paper serve as catalytically active surfaces in the flow battery 20. In the redox reactions of the flow battery 20, the energy barrier to the reaction is relatively low, and thus more expensive catalytic materials, such as noble metals or alloys, are not required as with cells that utilize gaseous reactants. In one embodiment, the carbon paper 68 is activated using a thermal treatment process to clean the carbon material, increase the surface area, and produce oxides that serve as active catalytic sites. In a further embodiment, the carbon paper is a carbon/carbon composite including carbon fibers and a carbon binder residue. Polyacrolynitrile is one example precursor for carbon fibers used in the carbon paper 68. A phenolic resin is one example precursor for carbon binder.

There is a tradeoff in flow batteries between performance and pressure drop of the flow of the liquid electrolytes through a cell. For example, in flow batteries that do not utilize flow fields and force the flow of the liquid electrolytes through carbon felt electrodes ("flow-through"), there is relatively good performance but high pressure drop (which requires more input energy to move electrolyte through the cell) and relatively low durability because of stack compression on the carbon felt and ion-exchange membrane. In flow batteries that utilize a flow field (i.e., "flow-by"), there is less of a pressure drop because the liquid electrolytes are not forced through the electrodes, but the performance is relatively lower because the enhanced mass transport afforded by the convective flow through the electrodes is not present to a significant degree.

The flow battery 20 utilizes a "mixed flow" flow field and the carbon paper 68 to provide a beneficial balance between pressure drop and performance. The term "mixed flow" refers to a combination of "flow-through" and "flow-by". In embodiments, the "mixed flow" is achieved through the arrangement of the flow field channels 54 and 56 on the first flow field plate 50 (and optionally also the second flow field plate 52). For example, the second flow field channel 56 is downstream from the first flow field channel 54, and thus the liquid electrolyte 22/26 in the second flow field channel 56 is at a lower pressure than the liquid electrolyte 22/26 in the first flow field channel 54 due to pressure loss. The difference in pressure causes a pressure gradient between the channels 54 and 56 that drives at least a portion of the liquid electrolyte 22/26 to flow over the rib 58 in the flow path 60 from the first flow field channel 54 into the second flow field channel 56. In a few examples, the flow field channels 54 and 56 are channels of a serpentine channel arrangement, interdigitated channel arrangement, partially interdigitated channel arrangement or combination thereof to provide the pressure gradient.

The characteristics of the carbon paper 68 are selected in accordance with the "mixed flow" design of the channels 54 and 56 to enhance performance and durability. For example, the carbon paper 68 has a predetermined compressive strain of less than 20% at a compressive stress of 0.8 MPa, an uncompressed porosity in the range 60-85%, and a thickness (t) in the range 150 to 400 μm (micrometers). A Young's modulus of compression could be specified instead of compressive strain provided the stress-strain response is linear. In comparison, carbon felts commonly used in flow batteries are relatively pliable and can intrude into channels to restrict flow and cause inconsistent performance. The relatively stiff carbon paper 68 reduces intrusion and thereby reduces flow restriction and increases performance consistency. Carbon felt is also relatively thick and increases stack size and the average distance that ions must move to reach an ion-exchange membrane. The relatively thin carbon paper 68 reduces stack size and the average distance of ion movement. Moreover, the carbon paper 68 is less compressible than felt and therefore does not require high stack compression, which improves stack durability. Additionally, carbon felt compresses over the ribs and thereby has an inconsistent porosity that debits flow distribution. The carbon paper 68 is relatively less compressible and therefore provides more uniform compression and flow distribution.

The predetermined compressive strength, thickness (t) and uncompressed porosity enable the forced flow component of the mixed flow of the liquid electrolyte 22 or 26 over the rib 58 between channels 54 and 56. For example, the compressive strength is greater than 0.8 MPa at 20% compressive strain, the uncompressed porosity is from 65-85 vol % and the thickness is from 150-400 micrometers. In a further example, the compressive strength is greater than 0.8 MPa at 10% compressive strain and the thickness is from 150-250 micrometers.

FIG. 3 shows a portion of another example of a carbon paper 168 for use in the flow battery 20. In this disclosure, like reference numerals designate like elements where appropriate, and reference numerals with the addition of one-hundred or multiples thereof designate modified elements that are understood to incorporate the same features and benefits of the corresponding elements. In this example, the carbon paper 168 includes catalytically active carbon fibers 170. The carbon fibers 170 are arranged randomly or in a pattern, such as a woven structure. Carbon particles 172 are disposed on the carbon fibers 170. The carbon particles 172 increase the surface area of the carbon paper 168 for enhanced catalytic activity. In one example, the carbon particles 172 have an average diameter of 10-100 nanometers and the carbon paper 168 includes 1-10 wt % of the carbon particles 172.

The carbon particles 172 can be substantially uniformly distributed through the carbon paper 168 such that the carbon paper 168 has a relatively uniform porosity. Alternatively, as shown, there is a concentration gradient 174 of the carbon particles 172 through the thickness (t) of the carbon paper 168 such that the carbon paper 168 has a graded porosity. In this example, the concentration decreases as a function of distance from the membrane side of the carbon paper 168. The concentration gradient 174 enables greater flow of the liquid electrolyte 22/26 near the flow field plate side of the carbon paper 168 and increased catalytic activity near the membrane side of the carbon paper 168 to reduce the average distance of ion movement relative to the ion-exchange membrane 66.

In embodiments, the carbon particles 172 are deposited onto the carbon fibers 170 using a liquid suspension of the carbon particles 172 in a carrier fluid. The liquid suspension is applied to the carbon paper 168, such as by spraying or dipping or painting, and then dried to remove the carrier fluid such that the carbon particles 172 remain in the carbon paper 168. The application and drying process can be repeated to achieve a desired loading level of the carbon particles 172. Additionally, a vacuum can be applied to one side of the carbon paper 168 during the application and/or drying process to achieve the concentration gradient 174.

FIG. 4 shows a portion of another example of a carbon paper 268 for use in the flow battery 20. In this example, the carbon paper 268 includes the catalytically active carbon fibers 170 and carbon particles 272 disposed on the carbon fibers 170. The carbon particles 272 have a multi-modal size distribution to further enhance activity and control porosity and conductivity. In this example, the carbon particles 272 include carbon particles 272a that have a first average diameter and carbon particles 272b that have a second average diameter that is greater than the first average diameter. In other examples, the carbon particles can differ in other aspects, such as microstructure and/or composition.

For example, one could have two particles with same diameter but very different density and fraction and size of micropores.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A redox flow battery comprising:
    a liquid electrolyte including an electrochemically active specie;
    a flow field plate defining flow field channels and ribs that separate the flow field channels;
    an ion exchange membrane; and
    an electrode sandwiched between the flow field plate and the ion exchange membrane, there being flow paths of the liquid electrolyte over the ribs between the flow field channels such that the liquid electrolyte that flows over the ribs must flow through the electrode, the electrode including a carbon paper that bridges over the flow field channels from the ribs, wherein the carbon paper has oxides that serve as active catalytic sites that are catalytically active with regard to the electrochemically active specie and defines a compressive strain of less than 20% at a compressive stress of 0.8 MPa, to provide a stiffness that reduces intrusion into the flow field channels, and an uncompressed porosity in the range 60-85%.

2. The redox flow battery as recited in claim 1, wherein the carbon paper comprises carbon fibers and carbon binder residue and has a uniform porosity through the thickness.

3. The redox flow battery as recited in claim 1, wherein the carbon paper comprises carbon fibers and carbon binder residue and has a graded porosity through the thickness.

4. The redox flow battery as recited in claim 3, wherein the carbon paper has a maximum porosity at the side near the flow field plate.

5. The redox flow battery as recited in claim 1, wherein the carbon paper has a thickness of 150-400 micrometers.

6. The redox flow battery as recited in claim 1, wherein the electrochemically active specie is based on vanadium, bromine, iron, chromium, zinc, cerium, lead or combinations thereof.

7. The flow battery as recited in claim 6, wherein the electrochemically active specie is based on vanadium.

8. The redox flow battery as recited in claim 1, wherein the carbon paper has a thickness of 150-400 micrometers.

9. The redox flow battery as recited in claim 8, wherein the carbon paper includes carbon fibers and carbon binder residue and carbon particles disposed on the carbon fibers.

10. The redox flow battery as recited in claim 9, wherein the carbon paper includes 1-10 wt % of the carbon particles.

11. The redox flow battery as recited in claim 9, wherein the carbon particles have an average diameter of 10-100 nanometers.

12. The redox flow battery as recited in claim 9, wherein the carbon particles have a multi-modal size distribution.

13. The redox flow battery as recited in claim 8, wherein the thickness is 150-250 micrometers.

14. A redox flow battery comprising:
    a liquid electrolyte including an electrochemically active specie is based on vanadium, bromine, iron, chromium, zinc, cerium, lead or combinations thereof;
    a flow field plate having a broad side and flow field channels with open channel tops at the broad side, the flow field channels being separated from each other by ribs;
    an ion exchange membrane;
    a carbon paper electrode between the flow field plate and the ion exchange membrane, the carbon paper electrode bridging from the ribs over the open channel tops, wherein the carbon paper electrode is catalytically active in electrochemically reversible redox reactions with regard to the electrochemically active specie and has an uncompressed porosity in the range 60-85%, wherein the carbon paper electrode has a compressive strain of less than 20% at a compressive stress of 0.8 MPa.

15. The redox flow battery as recited in claim 14, wherein the carbon paper electrode has a thickness of 150-400 micrometers.

16. The redox flow battery as recited in claim 15, wherein the carbon paper electrode includes carbon fibers, carbon binder residue, and carbon particles disposed on the carbon fibers, the carbon paper includes 1-10 wt % of the carbon particles, and the carbon particles have an average diameter of 10-100 nanometers.

17. The redox flow battery as recited in claim 16, wherein the carbon particles have a multi-modal size distribution.

* * * * *